United States Patent Office
3,452,346
Patented June 24, 1969

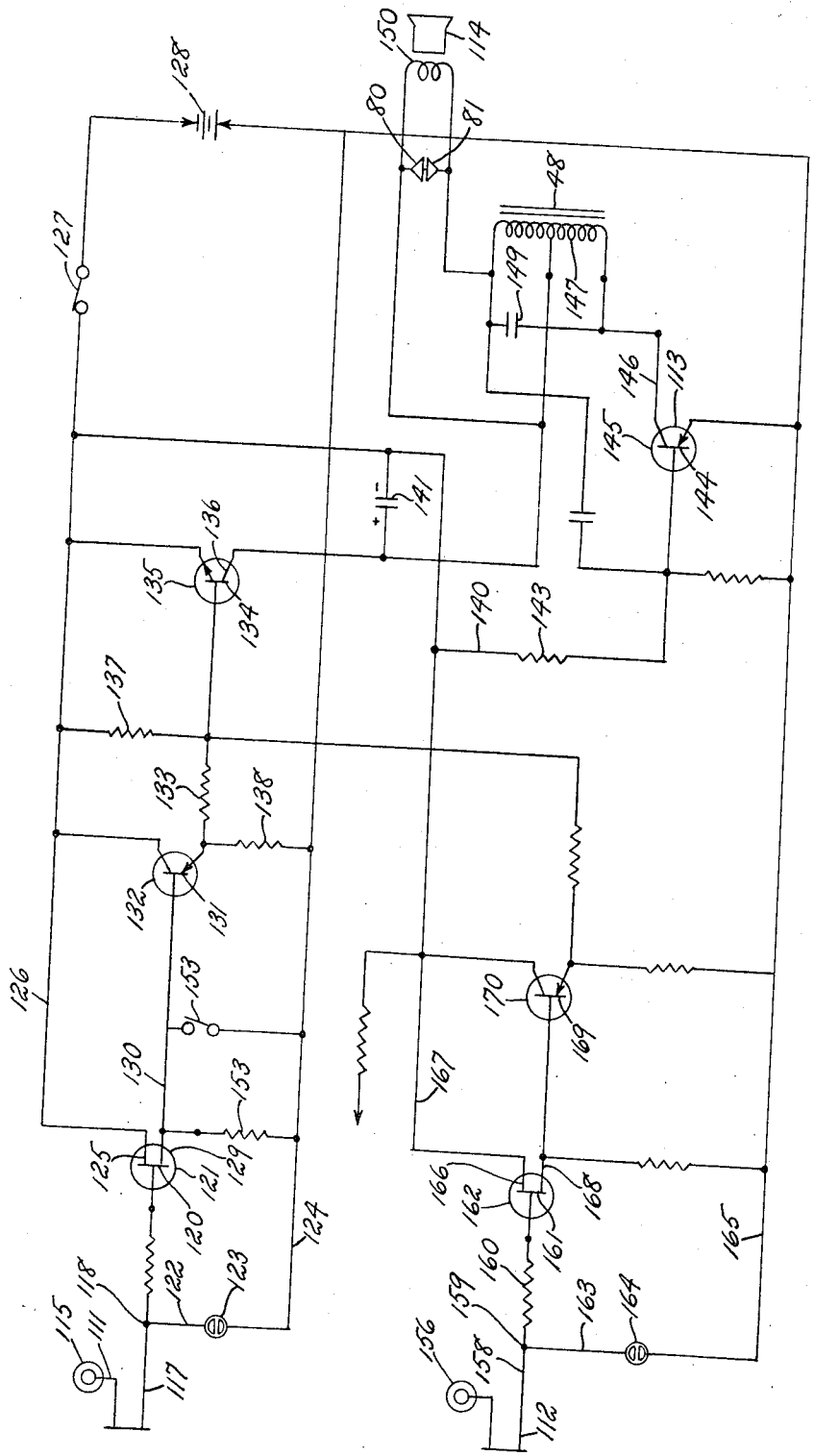

3,452,346
STATIC CHARGE DETECTOR
Julius B. Kupersmit, New York, N.Y.
(145—80 228th St., Springfield Gardens, N.Y. 11413)
Continuation-in-part of application Ser. No. 508,273, Nov. 17, 1965. This application Dec. 29, 1967, Ser. No. 709,845
Int. Cl. G08b 21/00
U.S. Cl. 340—248      4 Claims

ABSTRACT OF THE DISCLOSURE

A static charge detector in the form of a battery-powered sensing device, including neon tube means for grounding a signal in excess of a predetermined voltage, a gating transistor receiving a signal of voltage between predetermined limits below said predetermined voltage, an emitter follower connected to the emitter of the gating transistor, a switching transistor controlled by the emitter follower, and an oscillating transistor controlled by the switching transistor.

---

Figure 1:
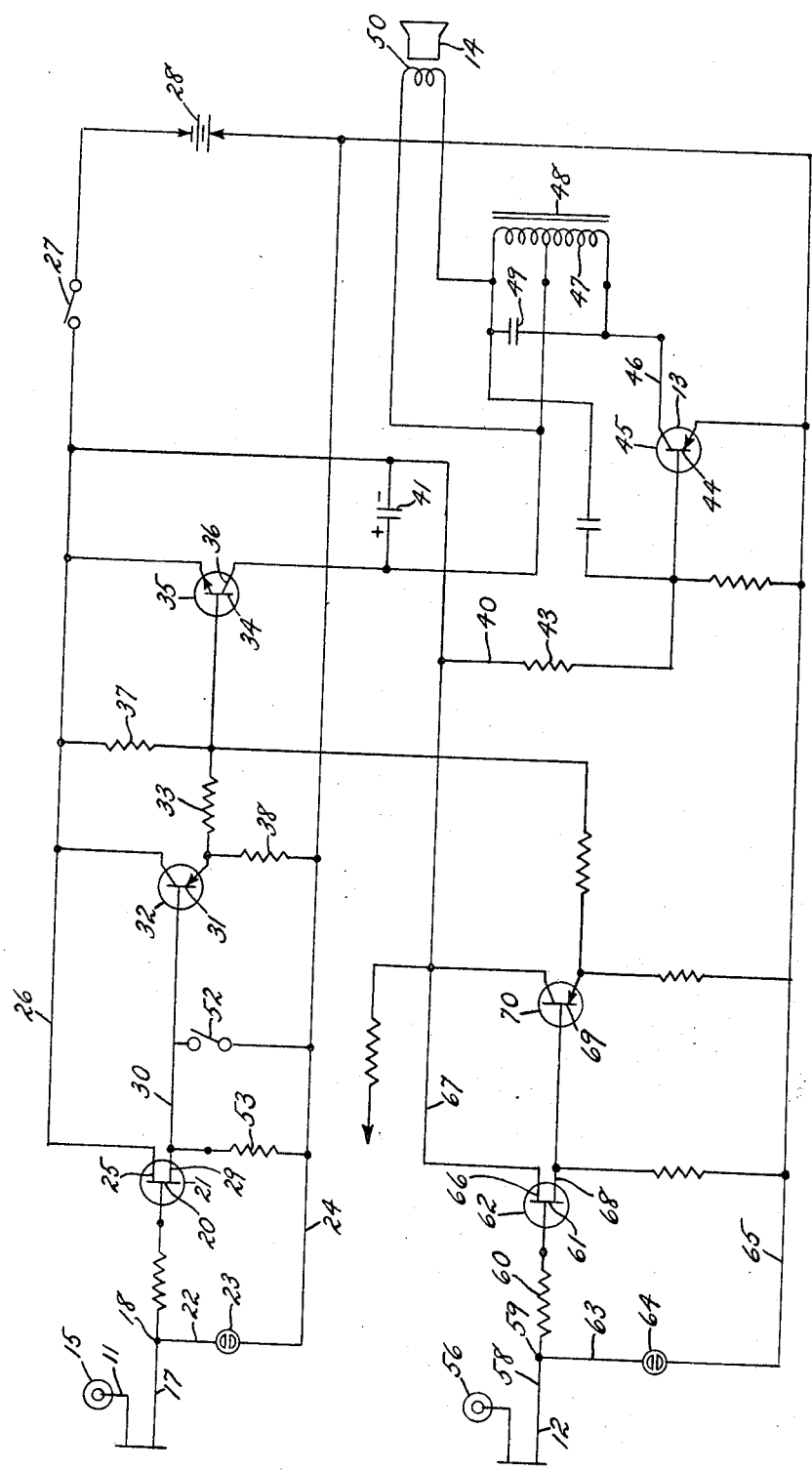

This application is a continuation in part of my co-pending application Ser. No. 508,273, filed Nov. 17, 1965, now abandoned entitled Static Charge Detector.

This invention relates generally to the field of sensing devices, and more particularly to a compact transistorized static charge detector useful in detecting the presence of static electricity upon objects within reasonable proximity to the device. While not limited to such application, the device is particularly suited for use in detecting the presence of static electricity, either in negative or positive quantites, within a medical operating room where anesthetics and other explosive gaseous media are often employed.

It is among the principal objects of the present invention to provide a small battery-powered sensing device which will detect the presence of static charges of dangerous proportions to provide an audible signal until the charge has been properly neutralized.

Another object of the invention lies in the provision of a static detector of the class described which may be allowed to remain in relatively constant operating codition with low current drain during the period in which no substantial static charge is present.

Another object of the invention lies in the provision of a static charge detector having no exposed switches which might arc during operation to provide a spark sufficient to explode a combustible gas.

Yet another object of the invention lies in the provision of a static charge detector of the class described which may be simple in operation, and which requires no special skills for the determination of a dangerous condition.

A feature of the invention lies in the fact that the device includes a self-contained testing circuit to determine the condition of the battery power source.

A feature of one of the disclosed embodiments lies in the ability of the same to detect both positive and negative charges. Another feature of one of the disclosed embodiments lies in the provision of Zener diodes as voltage limiting means for preventing excessive voltage surges which might cause explosion in a hazardous atmosphere.

In the drawing, FIGURE 1 is a schematic electrical wiring diagram of a first embodiment of the invention.

FIGURE 2 is a similar schematic electrical wiring diagram of a second embodiment of the invention.

In accordance with the first embodiment of the invention, the device includes a positive charge detection element 11, a negative charge detection element 12, oscillating means 13, and transducing means 14.

The schematic diagram is labelled to indicate the value of various resistors, capacitors, and other elements as well as their relative positions within the circuit.

The positive charge-detecting element 11 includes an input jack 15 which is connected to a static charge probe of well-known type, which includes a copper ball on the end thereof (not shown) upon which a charge may be induced when the same is placed in a position proximate to a charged article. Under normal operating conditions, this distance may be as great as six to eight feet. The charge is transmitted along a conductor 17 to a junction point 18. To prevent the circuit from becoming damaged by an excessive charge, a 1000-ohm resistor is connected between the junction point 18 and the base 20 of a field effect NPN transistor 21. Another conductor 22 leads from the junction point 18 through a neon lamp 23 which becomes conductive when the induced potential exceeds approximately 65 volts, thus providing a path through the conductor 24 to ground. The field effect transistor 21 includes a collector 25 connected to a conductor 26 leading through a switch 27 to a self-contained battery 28, which may be of mercury type, having a potential of eight volts. The switch 27 is preferably of a completely enclosed type, so that no arcing will occur during operation of the same. The emitter 29 is connected through a conductor 30 to the base 31 of a second transistor 32. When conductive current flows through resistor 33 to the base 34 of an NPN transistor 35 which operates as a switch, permitting current to flow directly from the battery 28 and through the emitter 36. Transistor 35 is connected to the oscillator 45 through conductor 40, capacitor 41, and resistor 43 to the base 44, and the output of the oscillator 45 is through a conductor 46 to the winding 47 of the transpormer 48.

When no potential is induced onto the receptor transistor 21 is connected as a source follower and draws a small idling current of about ⅕ milliampere. This current develops approximately eight volts at the bases of the emitter follower transistor 32 and 35. Under this condition, the base of the transistor 35, which operates as a solid state switch, is held at a low voltage with respect to its emitter, thus being effectively in the "off" position.

When a positive voltage is induced on the receptor connected to transistor 21, the field effect transistor is biased so that the drain source current is reduced to a low value. This is reflected as a lower voltage across resistor 37 and resistor 38. As a result, the voltage at the base of transistor 35 rises, providing a forward bias which drives transistor 35 to saturation in the "on" condition. When this occurs, the full battery voltage (less the saturation voltage of transistor 35) is applied to the audio oscillator transistor 45. Oscillation occurs at an audio frequency determined primarily by the resonance between the inductance of auto transformer 48 and capacitor 49. This frequency is used to power a transducer 50.

When the charge is removed from the receptor, the voltage across the oscillator decreases to the point where the oscillation dies out.

The power switch 27 is preferably of a sealed reed type, and is assembled with a small permanent magnet (not shown) which causes the contact to close, thus applying power to the device. When the device is not in use, it is inserted into a base which contains a larger permanent magnet of such position and polarity as to nullify the effect of the smaller internal magnet and cause the reed switch to open, thus turning the device off.

Switch 52 is a position-sensitive sealed mercury type, connected so that when the device is oriented more than 90 degrees from upright position, the contacts close, causing the resistor 53 to be placed in parallel with resistor 37, causing the voltage at the base of transistor 32 to be reduced. This, in turn, increases the base-to-emitter voltage of transistor 35 and turns it to the "on" state. If the battery is in proper operating condition, the audio tone from the transducer 50 will be heard.

The negative charge detector element 12 is generally similar to the positive charge detector element 11, and includes a jack 56 for the connection of an appropriate electrode. The charge, when received, is conducted through conductor 58 to a junction point 59. The resistor 60 corresponds to the resistor 19, and is connected to the base 61 of a field effect PNP transistor 62. A conductor 63 connects a neon lamp 64 corresponding to the lamp 23, in turn connected to a ground conductor 65. The transistor 62 includes a collector 66 connected to conductor 67 to the switch 27. The emitter 68 thereof connects to the base 69 of transistor 70, the output of which is connected to transistor 35, from which point operation and connections are identical to those of the positive charge detector element 11.

Turning now to the second embodiment of the invention, parts corresponds to those of the first embodiment have designated by similar reference characters with the additional prefix 1, thereby avoiding needless repetition.

The second embodiment differs from the first embodiment in the provision of a pair of Zener diodes 80 and 81, which are used as a voltage limiting device. They are placed back to back across the output coil 150. In the event of failure of the transformer 48, the collapse of the field created by the same could permit a sudden surge of voltage. The presence of the diode circuit limits the surge to approximately 10 volts, far below that normally required to cause an explosion where the device is operated in a hazardous atmosphere.

I wish it to be understood that I do not consider the invention limited to the precise details of structure shown and set forth in this specification, for obvious modifications will occur to those skilled in the art to which the invention pertains.

I claim:
1. A static charge detector comprising: receptor means for detecting a signal, neon tube means for grounding a signal in excess of predetermined voltage, a gating field effect transistor receiving a signal of voltage between predetermined limits below said predetermined voltage, an emitter follower connected to the emitter of said field effect transistor, a switching transistor controlled by said emitter follower, and an oscillating transistor controlled by said switching transistor.

2. Structure as set forth in claim 1, including transducer means powered by said oscillating transistor.

3. Structure as set forth in claim 2, further characterized in the provision of an additional set of first and second-mentioned transistors, said first pair of first and second transistors receiving positively charged signals, said second pair of first and second transistors receiving negatively charged signals.

4. Structure in accordance with claim 2, including Zener diodes connected in parallel with said transducer means for preventing excessive voltage surges.

References Cited

UNITED STATES PATENTS

| 2,591,898 | 4/1952 | Webster | 340—253 |
| 3,201,775 | 8/1965 | Pedersen | 340—248 XR |
| 3,273,066 | 9/1966 | Ruhnke. | |

JOHN W. CALDWELL, *Primary Examiner.*

D. K. MYER, *Assistant Examiner.*

U.S. Cl. X.R.

340—258; 324—72; 307—235, 253